United States Patent
Lejon

(10) Patent No.: US 6,415,600 B1
(45) Date of Patent: Jul. 9, 2002

(54) CATALYTIC CONVERTER SYSTEM FOR I.C.-ENGINE WITH DIVIDED FLOW AND TWO CONVERTERS

(75) Inventor: Svante Lejon, Södertälje (SE)

(73) Assignee: Saab Automobile AB (SE)

( * ) Notice: Subject to any disclaimer, the term of this patent is extended or adjusted under 35 U.S.C. 154(b) by 0 days.

(21) Appl. No.: 09/743,474

(22) PCT Filed: Jul. 7, 1999

(86) PCT No.: PCT/SE99/01238

§ 371 (c)(1),
(2), (4) Date: Mar. 6, 2001

(87) PCT Pub. No.: WO00/03130

PCT Pub. Date: Jan. 20, 2000

(30) Foreign Application Priority Data

Jul. 10, 1998 (SE) ................................ 9802509

(51) Int. Cl.$^7$ ................................. F01N 5/04
(52) U.S. Cl. .................... 60/280; 60/602; 60/605.2
(58) Field of Search ................ 60/602, 605.1, 60/280, 285, 313, 605.2

(56) References Cited

U.S. PATENT DOCUMENTS

| | | | |
|---|---|---|---|
| 4,813,232 A | * 3/1989 | Hitomi et al. | 60/280 |
| 5,103,645 A | * 4/1992 | Haring | 60/620 |
| 5,377,486 A | 1/1995 | Servati et al. | |
| 5,655,362 A | * 8/1997 | Kawajiri et al. | 60/285 |
| 5,832,725 A | * 11/1998 | Sim | 60/289 |
| 6,094,909 A | * 8/2000 | Weber et al. | 60/280 |
| 6,185,938 B1 | * 2/2001 | Zander et al. | 60/280 |

FOREIGN PATENT DOCUMENTS

| | | | |
|---|---|---|---|
| DE | 4344277 | * | 6/1995 |
| GB | 2280711 | | 2/1995 |
| WO | 98/29646 | | 7/1998 |

* cited by examiner

Primary Examiner—Thomas Denion
Assistant Examiner—Diem Tran
(74) Attorney, Agent, or Firm—Ostrolenk, Faber, Gerb & Soffen, LLP

(57) ABSTRACT

An exhaust system for a multi-cylinder internal combustion engine has at least two exhaust valves per cylinder. A first exhaust valve in each cylinder is connected to a first catalyst, and a second exhaust valve in each cylinder is connected to a second catalyst which opens out upstream of the first catalyst. The first exhaust valves or their outlets are kept closed during a starting phase of the engine, so that, during the starting phase, all the exhaust gases first pass through the second catalyst which is smaller than the first catalyst and is positioned closer than the latter to the engine.

8 Claims, 2 Drawing Sheets

CATALYTIC CONVERTER SYSTEM FOR I.C.-ENGINE WITH DIVIDED FLOW AND TWO CONVERTERS

TECHNICAL FIELD

The invention relates to an exhaust system for a multi-cylinder internal combustion engine.

STATE OF THE ART

Turbocharging an internal combustion engine, where supercharging is carried out by means of an exhaust-driven turbocompressor, has many advantages from the point of view of engine technology, and turbocharged engines are used increasingly frequently in cars.

One problem with modern turbocharged engines, however, is that it takes a relatively long time after starting to achieve good efficiency of a catalyst located downstream of the exhaust gas turbine. One reason for this is that the exhaust-gas turbine causes a drop in temperature when cold-starting. Furthermore, the narrow inlet at the turbine wheel results in high flow rates which lead to a high heat-transmission coefficient. The overall result is great thermal inertia upstream of the catalyst and, consequently, delayed ignition of the catalyst. Moreover, positioning the catalyst downstream of the exhaust-gas turbine leads to a relatively great distance between the engine and the catalyst. Reasons of space also make it usual to position the catalyst a long way from the engine, often under the floor of the vehicle.

OBJECTS OF THE INVENTION

The object of the invention is to produce an improved internal combustion engine from the point of view of exhaust gas. Another object is to achieve effective emission control more rapidly than previously when cold-starting.

DESCRIPTION OF THE INVENTION

These objects of the invention are achieved by means of an internal exhaust system in accordance with the invention.

By using a number of exhaust valves in each cylinder for distributing the exhaust-gas flow, it is possible to position a relatively small catalyst close to the engine and, during a starting phase, to guide all the exhaust gases to this catalyst before they reach an ordinary catalyst positioned downstream. The small catalyst starts functioning rapidly and, when the engine is hot, is exposed to only a proportion of the exhaust gases of the engine.

The solution according to the invention is particularly advantageous for turbo-engines because it means that exhaust gases do not have to be fed to the exhaust-gas turbine in connection with starting. As a result, the delay in effective emission control, which otherwise occurs in turbo-engines, is avoided.

The arrangement with a divided exhaust period also makes it possible to scavenge the engine more effectively than previously, with improved engine performance as a result.

Further features and advantages of the solution according to the invention emerge from the description and the other patent claims.

The invention is described below in greater detail with reference to exemplary embodiments shown in the drawing.

DESCRIPTION OF EXEMPLARY EMBODIMENTS

Figure 1:
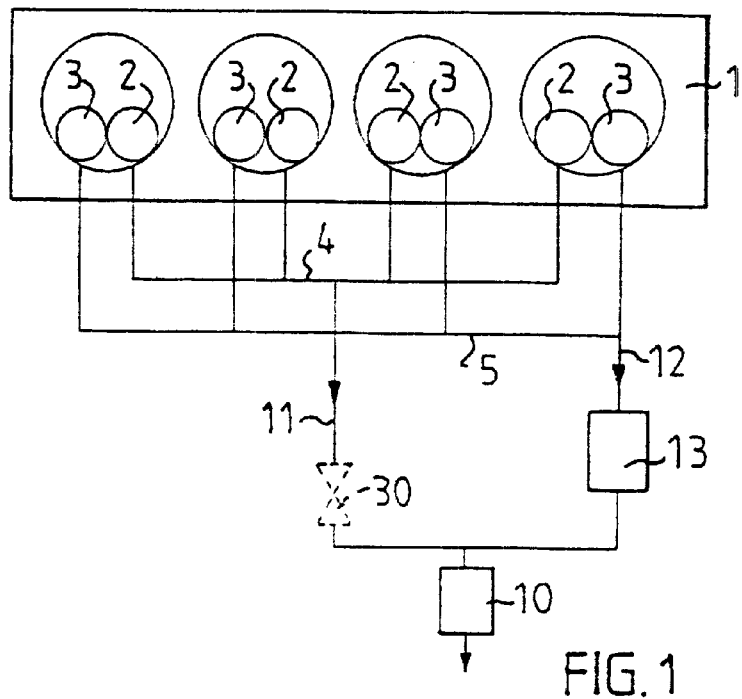
FIG. 1 shows diagrammatically an exhaust system according to the invention.

FIG. 1 shows diagrammatically an exhaust system according to the invention in a multi-cylinder internal combustion engine 1. The cylinders of the engine each have at least two exhaust valves 2 and 3. From the first exhaust valves 2 of the cylinders, exhaust gas is led out to a first exhaust manifold 4 common to the cylinders, which is connected to a first catalyst 10 via a first exhaust pipe 11. From the second exhaust valves 3 of the cylinders, exhaust gas if led out to a second exhaust manifold 5 common to the cylinders, which is connected to the first catalyst 10 via a second exhaust pipe 12 in which there is a second catalyst 13. One or more silencer(s) (not shown) is or are located downstream of the first catalyst 10 in the conventional manner.

Figure 2:
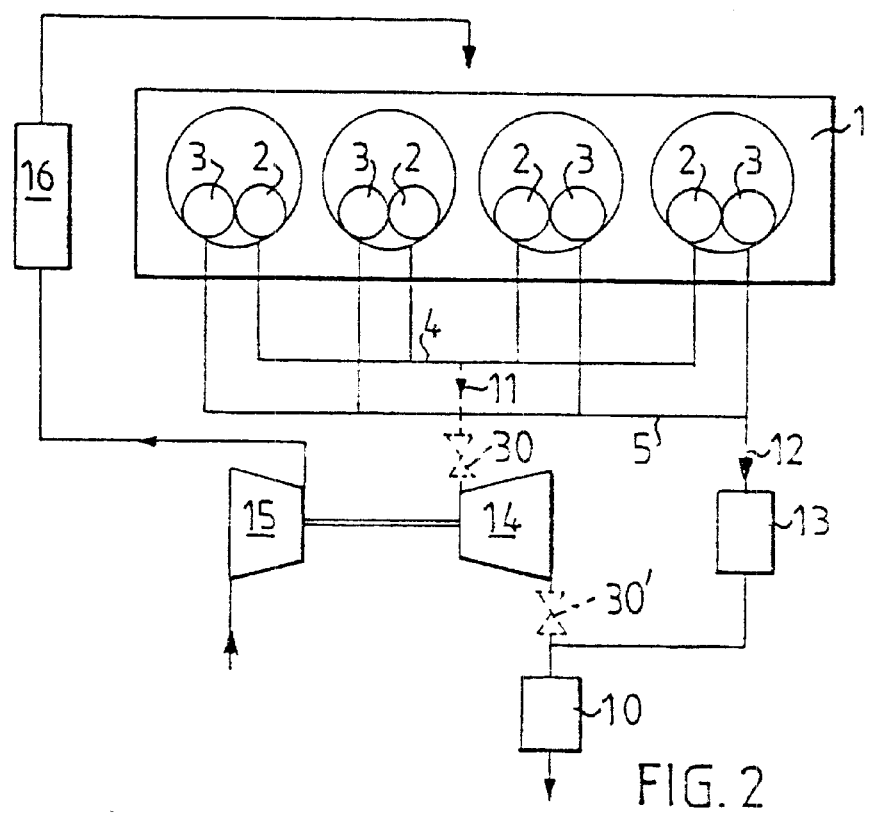
FIG. 2 shows an exhaust system according to FIG. 1 in a turbocharged engine.

FIG. 2 shows how the exhaust system in FIG. 1 is used for a turbo-engine, that is to say an engine in which supercharging is carried out by means of a compressor driven via an exhaust-driven turbine. The exhaust-gas turbine 14 is in this case connected into the exhaust pipe 11 and is therefore fed from the first exhaust manifold 4 and the first exhaust valves 2. A compressor 15 driven by the exhaust-gas turbine 14 provides the engine with charge air which is here cooled in an intercooler 16 before it is fed into the engine in the conventional manner (not shown in greater detail).

Figure 5:
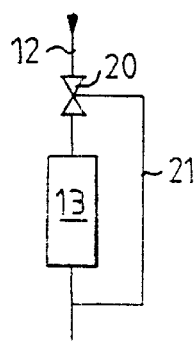
FIG. 5 shows an alternative embodiment of a detail of FIGS. 1 and 2.

When the engine 1 is started, and as long as it is still cold, the first valves 2 are kept closed and all exhaust-gas discharge is effected via the second valves 3 which feed all the exhaust gases to the second catalyst 13 via the second exhaust manifold 5. In connection with starting, peak power is not required from the engine, for which reason the second catalyst 13 can be dimensioned for a relatively small exhaust-gas flow and be positioned close or very close to the engine. In this way, it can be heated rapidly and achieve good functioning, so that effective emission control is achieved very quickly on starting. During the time that the second catalyst 13 is working, the first catalyst 10 is heated. It is normally serviceable after a period of time of roughly 30 s from starting. As the first catalyst 10 has thus become hot, the first exhaust valves 2 are set in operation so that they can feed exhaust gases out to the first exhaust manifold 4 and on from there to the first catalyst 10. A certain proportion of the exhaust-gas flow can continue to pass through the second catalyst 13 on the way to the first catalyst 10. If appropriate, a shunt valve 20 can be provided in the exhaust pipe 12, which valve can be adjusted when the engine is hot so that the second catalyst 13 is bypassed via a pipe 21 (FIG. 5).

In the example according to FIG. 2, the exhaust-gas energy is used to operate an exhaust-gas turbine 14, but the functioning is in other respects the same as for the exhaust system in FIG. 1.

The control of the exhaust valves in each cylinder can be effected in a number of different ways in order to achieve the desired function and the desired ratio between different exhaust-gas flows. A disadvantage of keeping the first exhaust valves closed for a period is that the engine power is limited during this period. This disadvantage is usually small, however, in comparison with the gain in terms of improved emission control.

A control of the exhaust valves 2 and 3 suitable for the embodiment according to FIG. 2 is shown in FIG. 3, with the engine cold, and FIG. 4, with the engine hot. In each figure, the left diagram a) represents the first exhaust valve 2, while the right diagram b) represents the second exhaust valve 3. In each diagram, A indicates the top dead centre of the piston, B the bottom dead centre of the piston, C the opening position of the exhaust valve, D the closing position of the exhaust valve and E the open time of the exhaust valve.

Figure 3A:
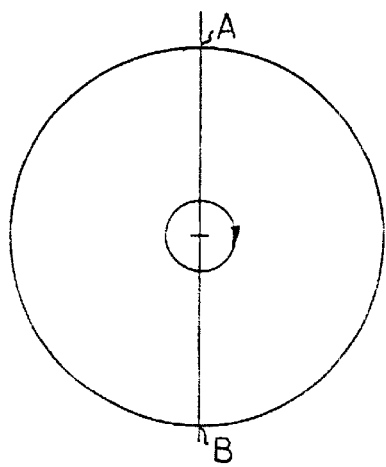
FIG. 3 shows the valve diagram for the exhaust valves in an engine according to FIG. 2 in the cold state, FIG. 4 corresponds to FIG. 3 but shows a hot engine instead.
Figure 3B:
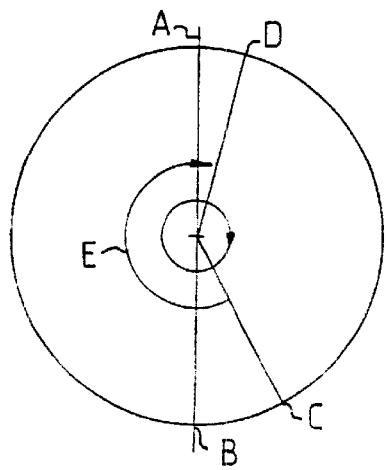

As can be seen according to FIG. 3, when the engine is cold, the first exhaust valve 2 (FIG. 3a) is kept closed, while the second exhaust valve 3 (FIG. 3b) opens at C, roughly 30° before the bottom dead centre B and is kept open until D, roughly 15° after the top dead centre A. All exhaust-gas discharge is thus effected via the second exhaust valve 3 during a long open time E, roughly 225°.

Figure 4A:
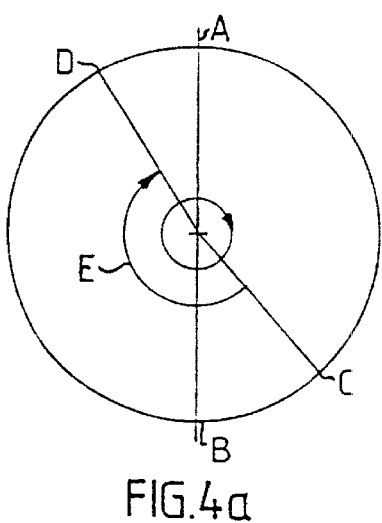
Figure 4B:
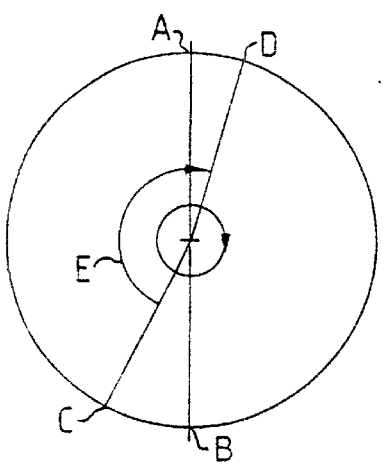

When the engine is hot, according to FIG. 4, the first exhaust valve 2 (FIG. 4a) starts functioning and opens at C, roughly 45° before the bottom dead centre B, and is kept open until D, roughly 30° before the top dead centre A. The open time E is thus roughly 195° in this case, but is dependent on the number of cylinders connected to the exhaust manifold. The angular values indicated are only an example for a four-cylinder engine. The second exhaust valve 3 (FIG. 4b) now opens slightly later than previously, at C in fact, roughly 30° after the bottom dead centre B, and is kept open until the same point as previously, namely until D, roughly 15° after the top dead centre A. This division of the open time between the valves 2 and 3 provides effective scavenging of the engine.

A special advantage of the embodiment according to FIG. 2 is that the major drop in temperature caused by the cold turbine 14 is avoided on starting, and a rapidly activated second catalyst 13 can be used initially while the ordinary, first catalyst 10 is heated. The division of the exhaust stroke also has other advantages, such as, for example, improved emptying of the cylinder because low-pressure exhaust gases do not have to pass through the turbine but can be conducted past the latter.

In order to be capable of handling an adequately large exhaust-gas flow when the engine is cold, it is appropriate if the second exhaust valve can open more, that is to say have a greater lifting movement, when the engine is cold than when the engine is hot.

As the majority of the exhaust-gas passes through the main catalyst at high power levels, the second catalyst 13 can suitably be designed so as to be capable of handling roughly 20–25% of the maximum exhaust-gas flow at full load of the engine, but should still be positioned as close to the engine as possible in order to undergo rapid heating.

Instead of keeping the exhaust valves 2 closed for a time after starting, it would also be possible to close their outlet, that is to say the first exhaust pipe 11, by means of a valve which can be opened and closed in order to achieve the desired distribution of the exhaust-gas flow. Examples of such an arrangement are shown in FIGS. 1 and 2, in which a valve 30 has been mounted in the first exhaust pipe 11. In the arrangement in FIG. 2, the valve 30 can suitably be mounted upstream of the exhaust-gas turbine 14, but positioning 30' downstream of the exhaust-gas turbine 14 is also possible. The valve 30 shown can advantageously be electrically controlled and will of course be in the open position during the major part of the operation of the engine.

What is claimed is:

1. Exhaust system for a multi-cylinder internal combustion engine comprising:
   a first larger catalyst connected to the engine, and a second, smaller catalyst also connected to the engine, said second catalyst discharging into an exhaust pipe upstream of the first catalyst so that, during a starting phase of the engine, all the exhaust gases pass through the second catalyst before they reach the first catalyst, at least one first exhaust valve in each cylinder is connected to a first exhaust manifold, which in turn is connected to the first catalyst via an exhaust-gas turbine in a turbo compressor for supercharging the engine, at least one second exhaust valve in each cylinder is connected to a second exhaust manifold, which is connected to the second catalyst, that opens into the exhaust pipe between the turbine outlet and the first catalyst, the first exhaust valves are arranged to be closed during the starting phase.

2. Exhaust system according to claim 1, characterized in that the first exhaust valve is arranged so as to be open only when the engine is hot, when the piston is at its bottom dead center, the valve opening before and closing after the bottom dead center so as to deliver high-pressure gas to the exhaust-gas turbine.

3. Exhaust system according to claim 1, characterized in that the second exhaust valve is arranged so as, when the engine is hot, to open after the first exhaust valve.

4. Exhaust system according to claim 1, characterized in that the second exhaust valve is arranged so as, during the starting phase, when the engine is cold, to open before the piston has reached its bottom dead center.

5. Exhaust system according to claim 1, characterized in that there are arranged upstream of the second catalyst a shunt valve and, associated with the latter, a shunt pipe which opens out upstream of the first catalyst, and in that the shunt valve is arranged so as, when the engine is hot, to shunt the exhaust gases past the second catalyst.

6. Exhaust system according to claim 1, characterized in that the second catalyst is arranged adjacent to the second exhaust manifold.

7. Exhaust system for a multi-cylinder internal combustion engine comprising a first larger catalyst connected to the engine, and a second, smaller catalyst also connected to the engine, said second catalyst discharging into an exhaust pipe upstream of the first catalyst so that, during a starting phase of the engine, all the exhaust gases pass through the second catalyst before they reach the first catalyst, at least one first exhaust valve in each cylinder is connected to a first exhaust manifold, which in turn is connected to the first catalyst via an exhaust-gas turbine in a turbo compressor for supercharging the engine, at least one second exhaust valve in each cylinder is connected to a second exhaust manifold, which is connected to the second catalyst, that opens into the exhaust pipe between the turbine outlet and the first catalyst, the at least one first exhaust valves are arranged to be closed during the starting phase, the at least one second exhaust valves are arranged so as to open more during the starting phase when the engine is cold than when the engine is hot.

8. An exhaust system for an internal combustion engine including a plurality of cylinders, each of which has first and second valves, the exhaust system comprising:
   a first manifold connected to the first valve of each of the cylinders for providing gas flow during a startup and subsequent operation of the engine;
   a second manifold connected to the second valve of each of the cylinders and in flow isolation with the first manifold for providing gas flow during the subsequent operation of the engine;

a first catalyst incorporated in the first manifold and located downstream from the first valves for purification of the exhaust gases discharged through the first valves during the startup and subsequent operations;

a second catalyst incorporated in the first manifold downstream from the first catalyst to provide further purification of the exhaust gases exited from the first catalyst, the second catalyst being incorporated in the second manifold to purify the exhaust gases discharged from the second valves during the subsequent operation of the engine;

a turbo-compressor incorporated in the second manifold between the second valves and the second catalyst for producing secondary air for the engine during the subsequent operation of the engine; and a controller for controlling the first and second valves so that the second valves are operated to block the gas flow along the second manifold during the startup operation and are open to allow the gas flow through the second manifold toward the turbo-compressor and the second catalyst during the subsequent operation.

* * * * *